Sept. 12, 1967   H. V. KIRK   3,341,390
MACHINE FOR APPLYING INTELLIGENCE TO A MOVING ARTICLE
Filed Feb. 4, 1964   8 Sheets-Sheet 1
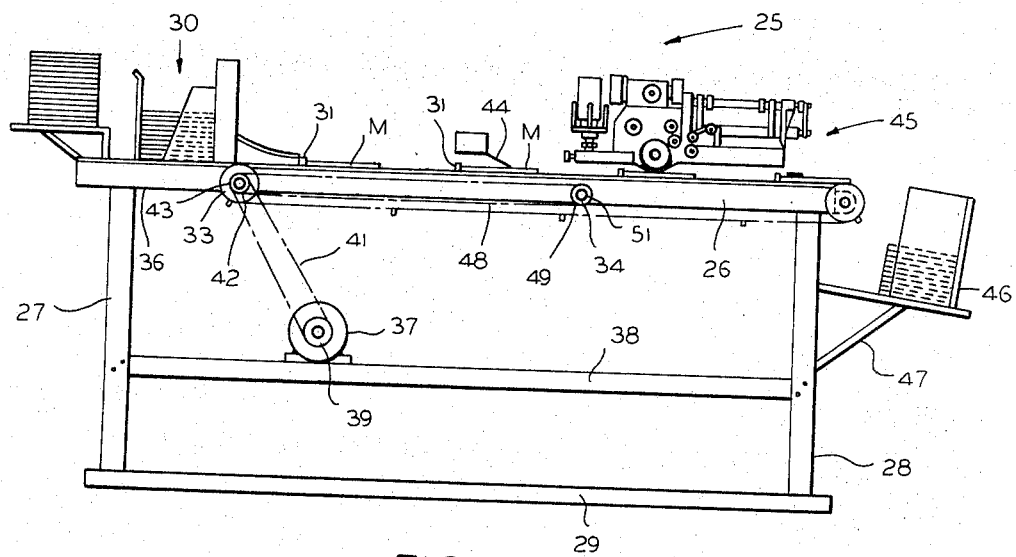
FIG.1
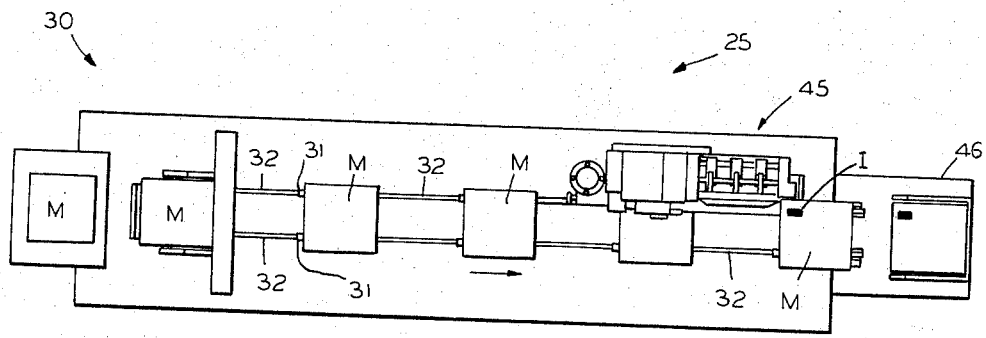
FIG.2
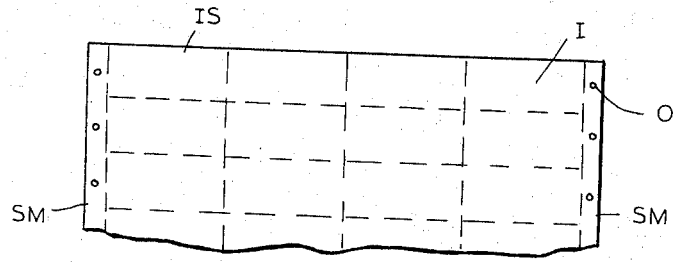
FIG.3
INVENTOR.
HARRY V. KIRK
BY
ATTORNEY

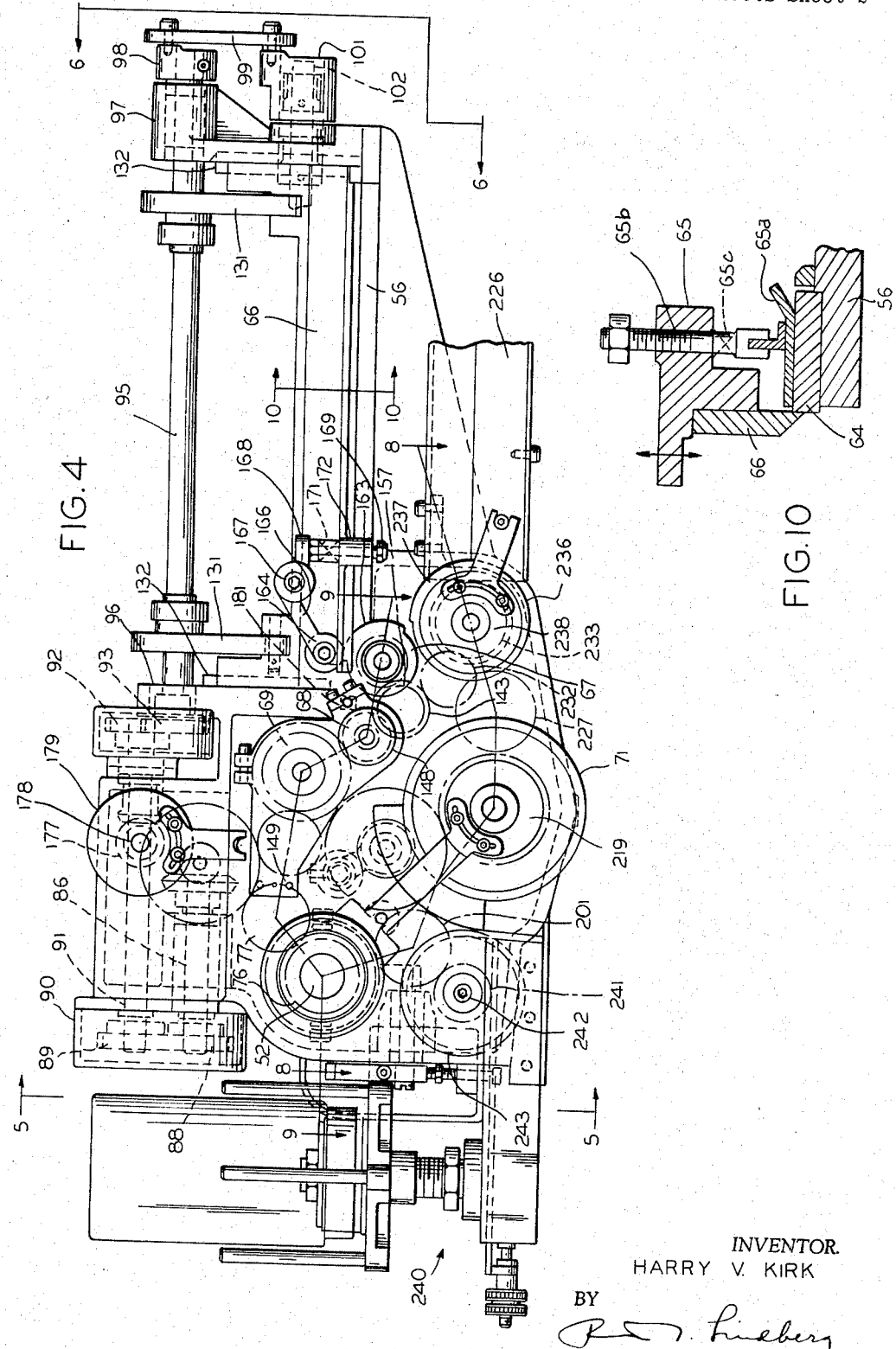

Sept. 12, 1967 H. V. KIRK 3,341,390
MACHINE FOR APPLYING INTELLIGENCE TO A MOVING ARTICLE
Filed Feb. 4, 1964 8 Sheets-Sheet 3
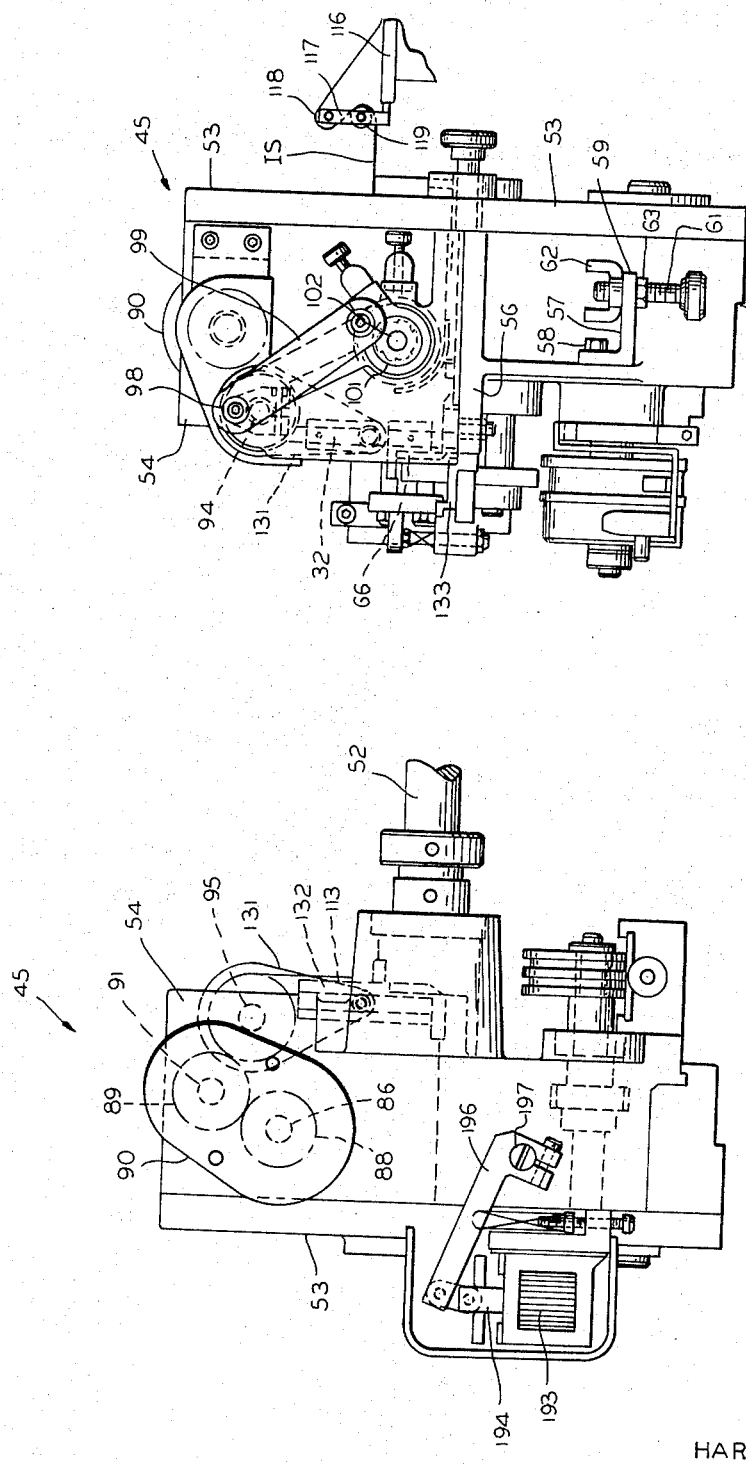
INVENTOR.
HARRY V. KIRK
BY
Richard C. Lindberg
ATTORNEY

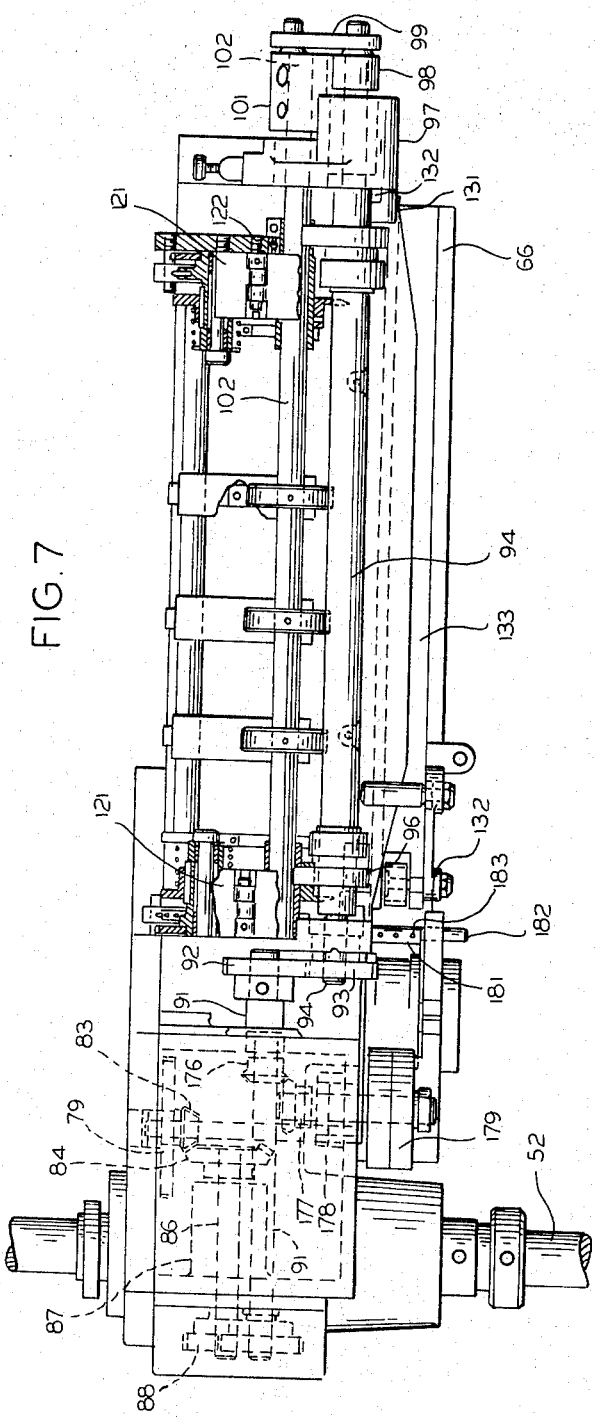

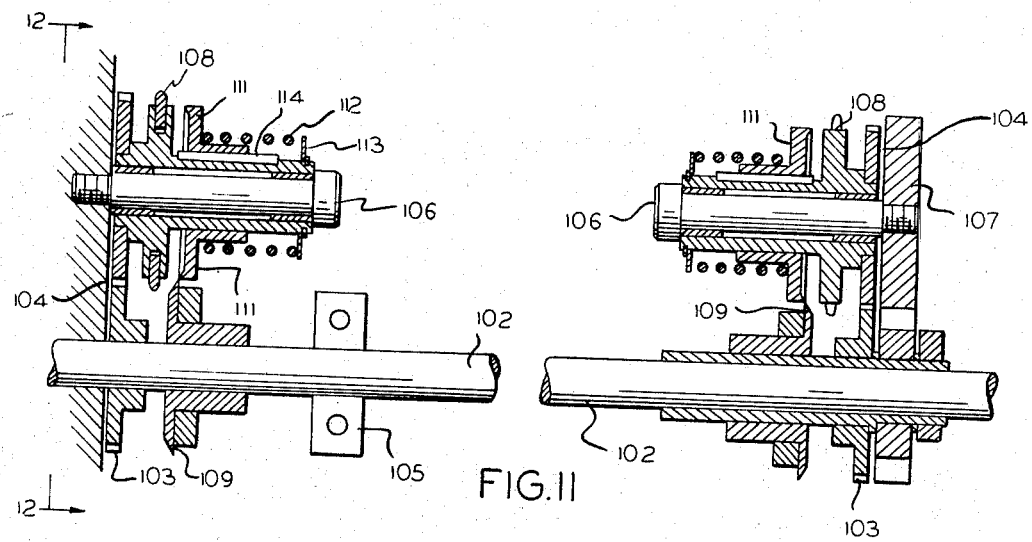
FIG.11
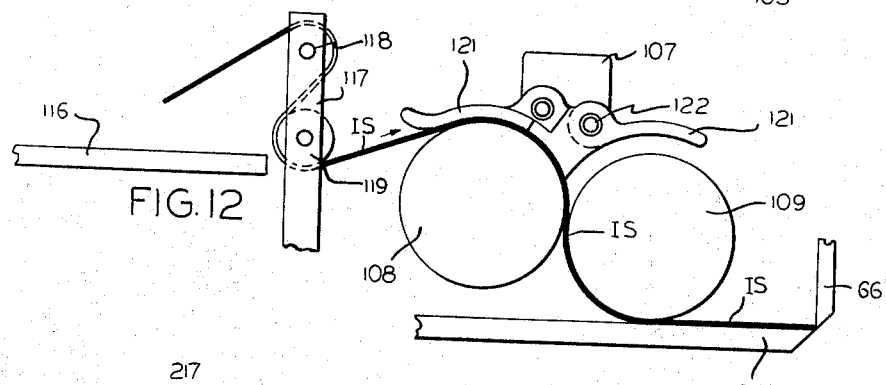
FIG.12
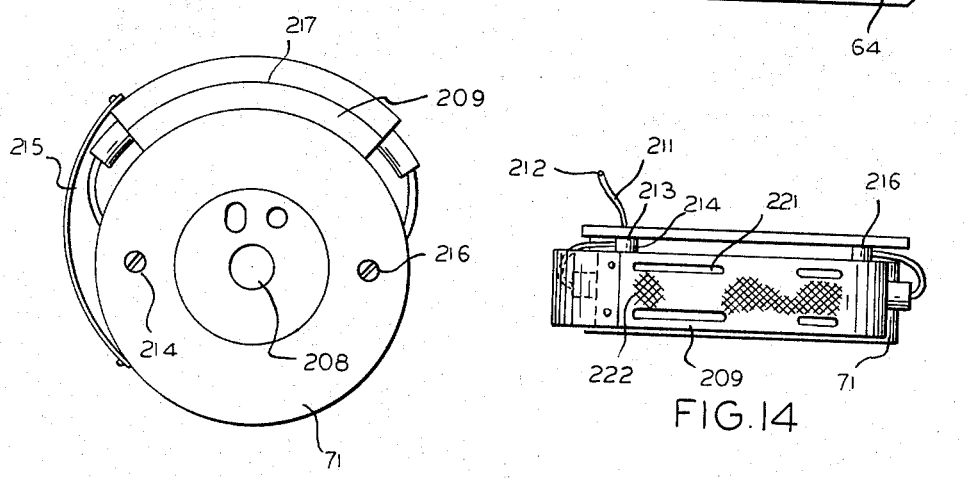
FIG. 13
FIG.14

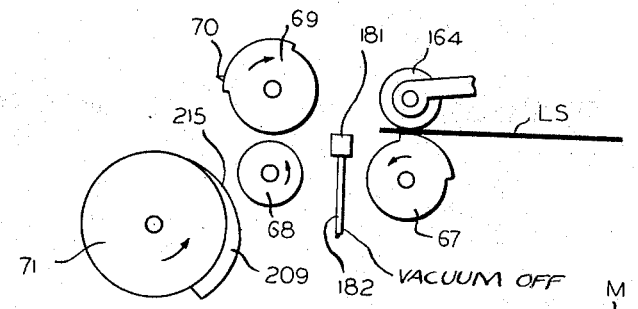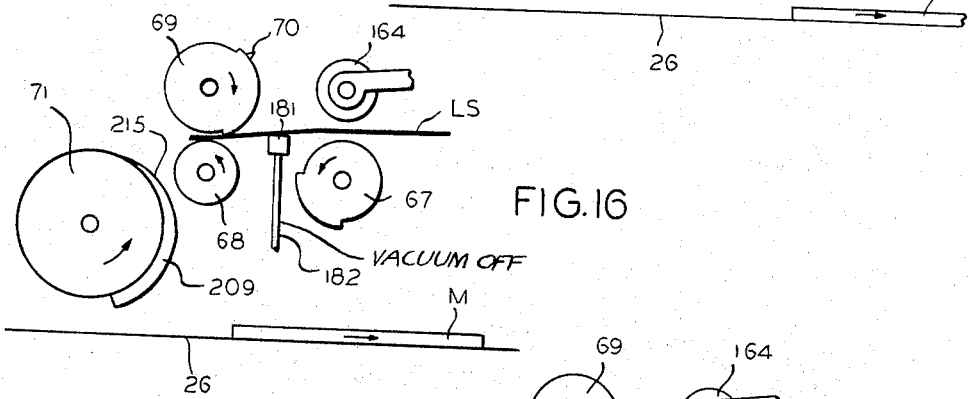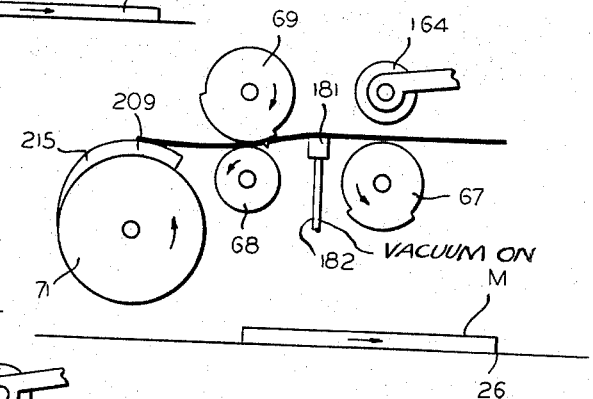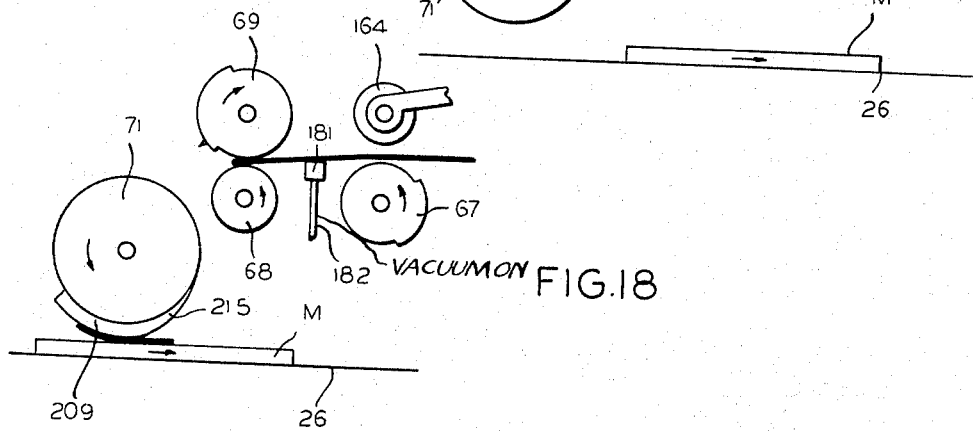

United States Patent Office 3,341,390
Patented Sept. 12, 1967

3,341,390
MACHINE FOR APPLYING INTELLIGENCE TO A MOVING ARTICLE
Harry V. Kirk, Libertyville, Ill., assignor to Cheshire Incorporated, a corporation of Illinois
Filed Feb. 4, 1964, Ser. No. 342,436
11 Claims. (Cl. 156—511)

This invention relates generally to machines for placing discrete intelligence upon a moving article such as a magazine or the like, and has particular reference to an improved machine for applying such discrete intelligence from a form pack where the intelligence is arranged thereon in a plurality of columns.

This invention is an improvement over that shown in Doane et al. Pat. No. 3,039,517, issued June 19, 1962, for Labeling Machines.

The machine according to the present invention is particularly adapted to perform the operations of severing a multi-columnar address bearing sheet transversely thereof into a strip bearing a number of discrete addresses, the strip being subsequently severed into discrete labels each having particular intelligence thereon. In those cases where the label is directly readable, the machine is adapted to glue the label directly to the moving article, but in those cases where the label has reverse or mirror images thereon, an obverse image is placed upon the moving article. As is disclosed herein such transfer is done from a heat impression label, but the same could be done by the conventional spirit duplicating type of label.

The invention herein is particularly directed to the handling of the strip severed from the form pack sheet, and it is a particular object of the invention to provide apparatus for the proper and efficient feeding of the severed strip to structure for severing the strip into discrete labels for further handling.

Another object is to provide structure cooperating with the shear for severing the form pack or sheet into an address strip, which structure is effective to handle the strip for the subsequent severing operations into discrete labels.

A still further object is to provide structure operable by the movement of the shear in forming the label strip for controlling the feed movement into strip severing structure forming discrete labels.

Other objects and important features of the invention will be apparent from the specification following taken with the drawings, which together describe and illustrate some preferred embodiments of the invention and what are now considered to be the best modes of practicing principles thereof. Other embodiments of the invention may be suggested to those having the benefits of the teachings herein, and such other embodiments are intended to be reserved especially as they fall within the scope of the appended claims.

In the drawings:

FIG. 1 is a front elevational view of a machine for applying intelligence to a moving article;

FIG. 2 is a plan view thereof;

FIG. 3 is a plan view of a portion of a form pack bearing intelligence thereon, and especially adapted for use with the machine according to the present invention, said sheet having the intelligence arranged thereon in 4 side-by-side columns;

FIG. 4 is a detailed front elevational view of an intelligence applying head adapted to be used with the machine seen in FIGS. 1 and 2;

FIG. 5 is an end view thereof looking in the direction of the arrows 5—5 of FIG. 4;

FIG. 6 is an opposite end view looking in the direction of the arrows 6—6 of FIG. 4;

FIG. 7 is a plan view of the head seen in FIG. 4, showing details of form pack feeding mechanism, and showing mechanism for severing the same transversely thereof into an intelligence bearing strip;

FIG. 10 is a transverse sectional view taken along the line of 10—10 of FIG. 4 looking in the direction of the arrows, and showing details of mechanism for severing the multi-columnar form pack transversely thereof into an intelligence bearing label strip;

FIG. 11 is a plan view of a portion of the mechanism seen in FIG. 7, showing details of mechanism for trimming the border portions of the form pack sheet seen in FIG. 3 prior to the transverse severing thereof into a label strip;

FIG. 12 is a somewhat schematic end view of FIG. 11 looking in the direction of the arrows 12—12 of FIG. 11;

FIG. 13 is a front elevational view of an intelligence applying roller, useable when the form pack seen in FIG. 3 has mirror images thereon capable of being transferred by heat and pressure;

FIG. 14 is a plan view thereof, showing structure for supplying heat energy to the roller seen in FIG. 13;

FIG. 15 is a schematic front elevational view of the structure for severing the form pack into a label strip, and for the subsequent feeding and the applying of the intelligence of a discrete label from such strip onto a moving article;

FIG. 16 is a view similar to FIG. 15 but showing severed strip fed into the bite of a pair of cutting and feeding rolls, for the subsequent transfer of the cut label to the intelligence applying roller;

FIG. 17 is a view similar to FIGS. 15 and 16, but showing a subsequent movement of the strip onto the applying roller, prior to the severing of the strip into a discrete label;

FIG. 18 is a view similar to FIGS. 15 and 17 inclusive, but showing the discrete label having the intelligence thereon applied to the moving article, and the position of a subsequent label with reference to the label feeding and severing structure;

FIG. 19 is a front elevational view of the knife roller seen in FIGS. 15 to 18 inclusive;

Figure 8:
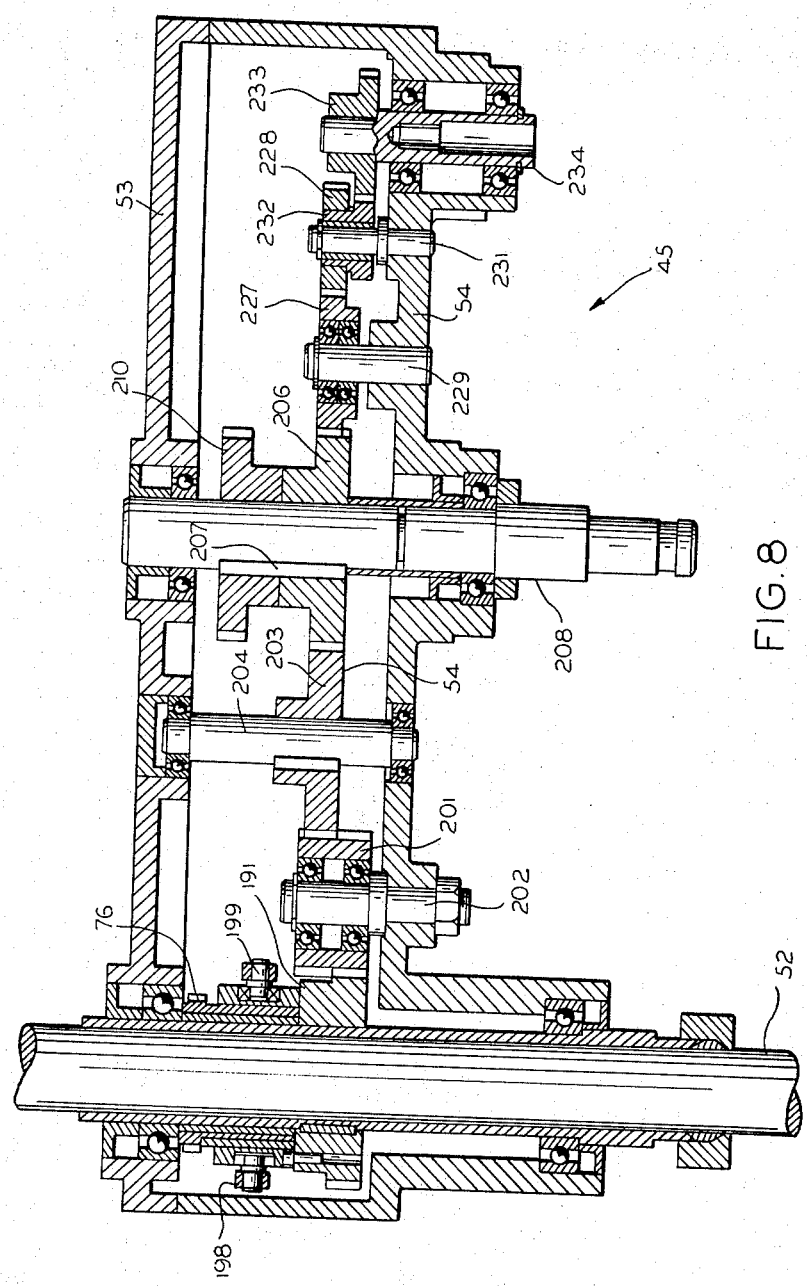
FIG. 8 is a sectional view looking in the direction of the arrows 8—8 of FIG. 4, showing details of a driving train for the intelligence applying mechanism of the apparatus seen in FIG. 4.

FIG. 20 is a side view thereof looking in the direction of the arrows 20—20 of FIG. 19; and FIG. 21 is a sectional view taken through the knife roller of FIGS. 19 and 20 looking in the direction of the arrows 21—21 of FIG. 19.

Referring now to FIGS. 1 and 2 of the drawings, the improved intelligence applying machine is referred to generally by the reference numeral 25 and includes a conveyor table 26 supported at its ends by legs 27 and 28, the bottom of the legs being joined by a base 29. A feed mechanism indicated generally by the reference numeral 30 is supported on conveyor table 26 at one end thereof, and is adapted to feed magazines or other flat articles M in the direction indicated by the arrow in FIG. 2, each article M fed by the feed mechanism 30 being adapted to be engaged by lugs 31 of laterally spaced endless conveyor belts 32 reeved between a driving pulley 33 and an idler pulley 34. Pulleys 33 and 34 are supported on laterally spaced frames 36 underlying the conveyor table 26 and secured to the upper ends of legs 27 and 28.

Power for driving the endless conveyor belts 32 includes a drive motor 37 mounted on a platform 38 extending between the supporting legs 27 and 28. Motor 37 drives a pulley 39 and a timing belt 41 is reeved between the pulley 39 and a pulley 42 fast on a shaft 43 supporting the driving pulley 33.

Details of the feed mechanism 30 are illustrated in detail with reference to Ridenour Pat. No. 2,606,681, Machine for Applying Address Labels, issued August 12, 1952, and so need not be described in detail herein. The articles M engaged by the lugs 31 of the conveyor belt 32 are moved at regularly spaced intervals, each article moving past a sensing switch 44 controlling the operation of an intelligence applying head constituting part of the improvements of the present invention, and referred to generally by the reference numeral 45.

The intelligence applying head 45 is arranged to place a discrete bit of intelligence I upon each article M, as it moves past the head 45, and after moving past the head 45, the articles M are discharged by the conveyor belts 32 into a receiving hopper 46 mounted on a bracket 47 secured to the end legs 28.

The intelligence applying head 45 is driven in timed relationship to the articles M by means of a sprocket chain 48 driven by a sprocket, not shown, fast on the shaft 43, and sprocket chain 48 drives a sprocket 49 fast on a shaft 51 disposed beneath the table 26 and beneath the intelligence applying head 45. Shaft 51 carries a sprocket, not shown, cooperating with a sprocket driving chain connected to a sprocket, not shown, fast on a main driving shaft 52 for the intelligence supplying head 45, see FIG. 7. As seen in Doane et al. Patent No. 3,039,517, shaft 52 may be disposed in standards laterally spaced from each other, and secured to the table 26, and details of the structure as seen in the aforesaid Doane et al. patent are incorporated by reference herein insofar as such details may be made necessary to the disclosure of the within invention.

Referring now particularly to FIGS. 4 to 9 of the drawings, the intelligence applying head 45 includes a pair of spaced frame members 53 and 54, these being secured together in any convenient fashion. Frame member 54 has an extension 56 therefrom providing a frame over which a multi-columnar sheet IS having the discrete intelligence portions I thereon, see FIG. 3, is guided.

The housing comprising the frame members 53 and 54 for the head 45 is adapted to be supported on shaft 52, and is adjusted with reference to the table 26 with the shaft 52 as a pivoting point. Frame 54 accordingly has a bracket 57 extending therefrom and held by a cap screw 58 to the frame member 54. Bracket 57 has an arm 59, and an adjusting screw 61 bearing against table 26 is adjusted in position with respect to the arm 59 by means of a wing nut 62 and a locking nut 63, see FIG. 6. The head 45 may thus be raised and lowered with respect to the table 26 in accordance with the thickness of the article M moved by the conveyor belts 32.

The intelligence applying head 45 comprises a fixed knife 64, see FIG. 10, mounted on the table 56, fixed knife 64 cooperating with a movable knife 66 to sever the sheet IS seen in FIG. 3 transversely thereof into a label strip LS containing the discrete intelligence portions I thereon, these corresponding in number to the columns arranged on the sheet IS.

As seen in FIG. 10, movable knife 66 is held on a frame 65 and as the form pack sheet IS is moved into position to be severed it moves beneath a holding shoe 65a supported on a stud 65b, a spring 65c being interposed between frame 65 and shoe 65a, the sheet IS is first clamped into position on table 56 for shearing, and so that the return movement of shear 66 does not immediately release sheet IS until the return movement of shear 66 is completed.

The so-severed strip is moved by a strip feed roller 67 into the bite of an anvil roller 68 and a rotary knife roller 69 carrying a knife 70. The two rollers 68 and 69 operate to feed a discrete label bearing the intelligence I thereon to the periphery of an impression roller 71, where the intelligence I thereon is placed upon the moving article M either in the form of a severed and pasted label, or in the form of an obverse image in cases where the discrete label has reverse images thereon capable of being transferred to the article M by either heat and pressure, or by what is known as "spirit duplication" process.

Figure 9:
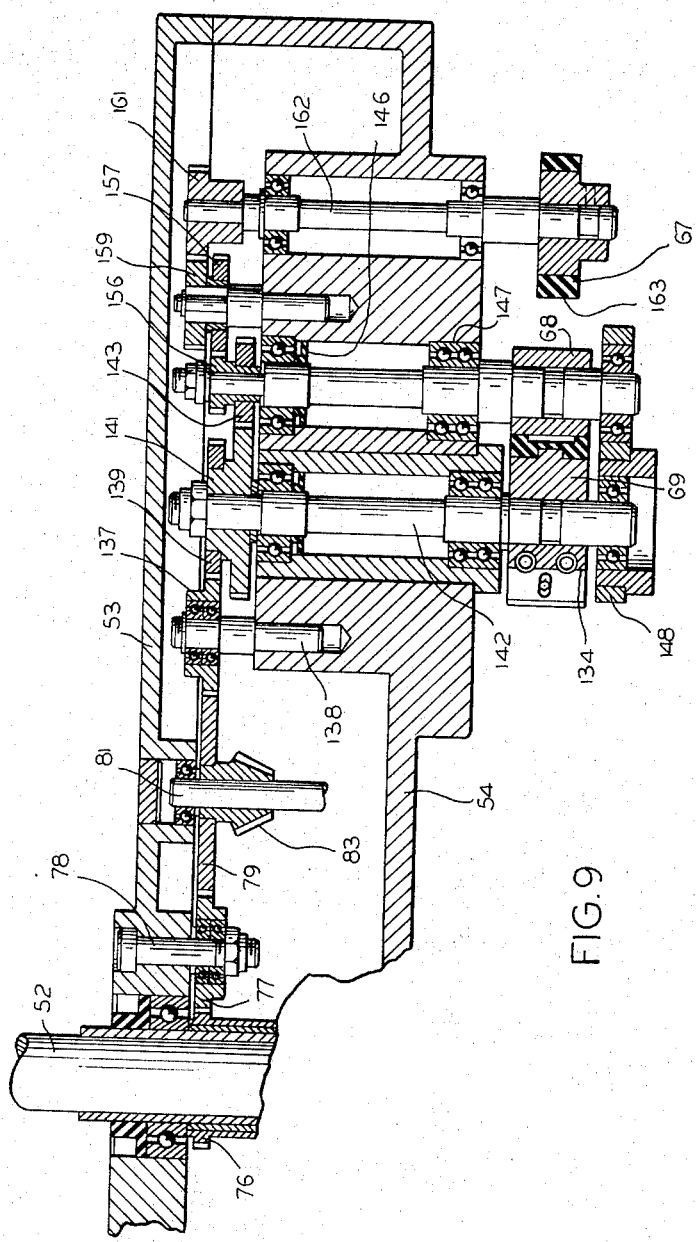
FIG. 9 is a similar sectional view taken along the line 9—9 of FIG. 4, looking in the direction of the arrows, showing details of a driving train of mechanism for severing and feeding a discrete intelligence bearing label.

Structure is provided for feeding the form pack sheet IS seen in FIG. 3 in intermittent fashion and to sever same prior to separating the severed strip into discrete labels L for subsequent taking of intelligence therefrom, or for applying the label L to the moving article M. To this end, and as seen in FIGS. 4, 7 and 9 particularly, the main drive shaft 52 has a gear 76 driven thereby, gear 76 meshing with an idler gear 77 held on a stub shaft 78 supported in the frame 53. Idler gear 77 in turn meshes with a gear 79 fast on a shaft 81 supported in the frame 53. A bevel pinion 83 is fast on a shaft 81 and meshes with a bevel gear 84 fast on a shaft 86 supported in a bearing 87 in the frame 54. Shaft 86 has a change gear 88 at the end thereof, gear 88 meshing with a gear 89 fast on a shaft 91 also supported in the frame 54, see also FIG. 5. Gears 88 and 89 are enclosed within a housing 90 at the left end of frame 54 as seen in FIG. 5.

Shaft 91 has a gear 92 fast at the other end thereof which meshes to a gear 93 fast on a shaft 94 of the form pack feed mechanism. Shaft 94 is supported near its left end in a bearing support 96 and at its other end in a support 97 secured at the extreme end of the table 56. Shaft 94 has an eccentric mid portion 95 and a crank 98 mounted at the right hand end thereof which cooperates with a connecting rod 99 to give rocking motion to a ratchet drive member 101 mounted on a ratchet shaft 102. Details of ratchet drive member 101 is disclosed in Doane 3,039,517 and is arranged to prevent retrogressing movement of the sheet IS so that its intermittent is in a direction toward the knives 64 and 66.

The ratchet shaft 102, see FIG. 11, is mounted in supports 105 on the table 56, and has gears 103 mounted on each end thereof. These mesh with gears 104 mounted upon stub shafts 106, these being supported in brackets 107 extending upward from the table 56. Stub shafts 106 each have an intermittently operated pin roller 108 fast thereon, these engaging openings O in the sides of the pack form IS seen in FIG. 3.

As the pin rollers 108 advance the form pack IS perforated side margins SM thereof are sheared off by rotating shear knives 109 and 111, shear knives 109 turning with the shaft 102, and shear knives 111 turning with stub shafts 106. Shaft 106 has its shear knife 111 urged into contact with shear knife 109 by means of springs 112 constrained between the knife 111 and a holding washer 113, shear knife 112 being adapted to slide longitudinally with respect to the stub shaft 106, but being turnable therewith by reason of splines 114.

Referring now particularly to FIG. 12, the form pack IS is mounted on a table 116 adjacent the shelf 56, see also FIG. 6. The table 116 has a bracket 117 supporting idler rolls 118 and 119 for the form pack IS, it being led over the pin rollers 108 and beneath guards 121 for the knives 109 and 111 supported on stub shafts 122 secured at their ends in the supports 107 and 109 as the case may be. The severed marginal strips SM then take a path to the rear of the head 45 as seen in FIG. 12, the remainder of the form pack being advanced beneath knives 109 to meet the shear knives 64 and 66 by the intermittent driving action of the pin rollers 108, the trimmed form pack IS being advanced across the stationary shear knife 64.

Structure is provided for operating the movable knife 66, and includes a follower 131, see FIGS. 5 and 6, movable by the eccentric portions 95 of shaft 94, and guided in gibs 132, see FIG. 7, located on the end standards 107. The operation of the movable knife 66 takes place after the intermittent drive action of the pin rollers 108 has been completed, and the form pack sheet IS has been led across the fixed knife 64, the so-severed strip being deposited upon a fixed table 133 in front of the fixed knife 64.

Structure is provided for moving the so-severed strip from the table 133 between the pair of cooperating knife and anvil rollers 69 and 68, these two rollers running in timed relationship to the impression roller 71.

Power for driving the roller 69, the anvil roller 68 and the impression roller 71 is derived from the main power shaft 52, and referring now particularly to FIG. 9 of the drawings, the power train includes gear 76 fast on the drive shaft 52, idler gears 77, gear 79, and a reaching gear 137 mounted on a stub shaft 138 supported in the frame member 54. Said power train also includes a pinion 139 fast with a gear 141 secured to a knife roller shaft 142, knife roller 69 being mounted on shaft 142 to front of the frame 54. Gear 141 meshes with a pinion 143 fast on a shaft 144 turning within bearings 146 and 147 in the frame 54, shaft 144 having the anvil roller 68 mounted at the end thereof. The protruding ends of the shafts 142 and 144 are supported in an auxiliary front frame 148, see also FIG. 4, secured by screws 149 to the front of the frame 54.

Structure is provided for controlling the feed movement of the strip which has been severed by the moving knife 66 and which is in position on the shelf 133, and to this end the shaft 144 for turning the anvil roller 68 has a pinion 156 thereon cooperating with an idler gear 157 mounted on a stub shaft 158 supported in the front frame 54. Stub shaft 158 also supports a reaching gear 159 meshing with a gear 161 mounted on a shaft 162 supported as seen in FIG. 9 in the front frame 54. Shaft 162 supports the segmented feed roller 67 which has a raised pad 163 thereon adapted to move into contact with the underside of the label strip severed from the form pack IS.

The moving shear knife 66 supports structure for engaging the severed strip LS and cooperating with the segmented feed roller 67, such structure comprising an idler roller 164 mounted at the end of a bell crank 166 pivoted at 167 to the movable shear blade 66. The bell crank 159 has an arm 168 and a headed pin 169 is tapped into the bell crank arm 168, there being a spring 171 interposed between the bell crank arm 168 and a guide 172 for the headed pin 169. Guide 172 is fixed in position on the table 56 holding the fixed shear blade 64.

The movement of the moving shear blade 66 against the paper strip forces the roller 164 into contact with the raised pad 163 on the segmented roller 67. The rotation of the roller 67 moves the label strip to the left as seen in FIG. 4 into the bite of the anvil roller 68 and the knife roller 69. When the severing operation is completed the raising of the movable shear blade 66 raises the idler roller 164 out of contact with the segmented roller 57. The operation of the structure just described is best seen with respect to FIGS. 15 to 18 inclusive, FIG. 15 showing the movement of the label strip LS by the idler roller 164 and the segmented roller 67 to the left into the bite of the knife roller 69 and the anvil roller 68.

Structure is provided for holding the label strip LS in position during certain portions of the cycle of operation seen with respect to FIGS. 15 to 18 inclusive, and as seen particularly in FIG. 7 the power shaft 91 for controlling the operation of the form pack IS has a bevel gear 176 fast thereon which cooperates with a bevel gear 177 mounted on a shaft 178 controlling the operation of a vacuum valve indicated generally by the reference numeral 179. Said valve may be constructed as is disclosed in Doane et al. Pat. No. 3,005,565 issued Oct. 24, 1961, or as shown in Doane et al. Pat. No. 3,039,517 issued June 19, 1962. The precise details of the vacuum valve 179, therefore, need not be described in this specification, but it is sufficient to say that the same is connected to provide a controlled vacuum to a vacuum block 181 supported by the auxiliary front frame 148 seen in FIG. 9. A vacuum line 182 leads to the vacuum block 181 from vacuum valve 17, and the same has a plurality of vacuum openings 183 therein, vacuum being manifested against the openings thereof to impose a controlled drag on the label strip LS seen in FIGS. 15 to 18 inclusive.

As seen in FIG. 15, when the shearing action has been completed against the form pack IS, and the segmented feed roller 67 and the idler roller have the label strip LS engaged therebetween, the vacuum block 181 has no vacuum thereon and the strip is moved by the segmented roller 67 into the bite of the anvil roller and the knife roller 69, as seen more clearly in FIG. 16. The two rollers are adapted to move the strip LS and to cut a discrete label therefrom, the same being fed on to the impression wheel 71.

Structure is provided for moving the impression wheel in timed relationship to the knife roller 69 and the anvil roller 68, and as seen in FIG. 8, the main power shaft 52 has a gear 191 fast thereon through the medium of a pin-type clutch indicated generally by the reference numeral 192. The sensing switch 44 seen in FIG. 1 controls the operation of the pin clutch 192 through the medium of a control solenoid 193 having an armature 194, and a rock arm 196 operated thereby to rock a shaft 197 controlling the disengagement of the pin clutch 191. Rock shaft 197 controls the operation of a rock arm 198 connected to an actuator 199 for the pin clutch 192.

Upon the occurrence of a "miss" in feeding of the articles M, the pin clutch 192 is disengaged, and power is no longer supplied to the gear 191.

As seen in FIG. 8 the driving gear 191 for the impression wheel 71 is made integral with the driving gear 76 controlling the feeding of the pack form IS, the segmented feed roller 68, and the anvil roller 68 and the knife roller 69. Therefore, upon operation of the pin clutch 192 upon the occurrence of a "miss" the entire mechanism made inoperative until the solenoid 193 is deenergized by the recurrence of movement of a subsequent article M.

Driving gear 191 meshes with a reaching gear 201 held on a stub shaft 202 in the front frame 54, gear 201 meshing with a second reaching gear 203 mounted on an idler shaft 204 having its ends supported in the front and rear frames 53 and 54. Reaching gear 203 meshes with an impression roller drive gear 206 held by a key 207 to a shaft 208 supporting the impression roller 71, shaft 208 being held in bearings in the front and rear frames 53 and 54 as seen in FIG. 8. A second gear 210 on shaft 208 serves to splash lubricant within the housing defined by frames 53 and 54.

Referring now to FIGS. 13 and 14, the impression roller 71 turns with the shaft 208, and has a raised pad 209 thereon adapted to receive the label which has been cut from the label strip LS and is fed thereon by the coaction of the anvil roller 68 and the knife roller 69. The raised pad 209 on impression roller 71 is adjacent to a fairing shoe 215. In the case where a form pack is provided with intelligence in the form of reverse images capable of transfer onto the moving article into obverse images the raised pad 209 may be supplied with heat from a pair of power leads 211 and 212, connected to a stationary slip ring assembly 213. Brushes 214 and 216 carried by impression roller 71 are in contact with the slip rings of slip ring assembly 213 to supply power to heating elements 217 within the raised pad 209.

Irrespective of whether the impression roller 71 is provided with a heating element for the transfer of intelligence from a reverse image label, the same is provided with a vacuum valve 219 controlling the application of vacuum to openings 221 in the surface of the raised pad 209. The surface of the pad 209 may be knurled as seen at 222 to control the vacuum along the back of the label thereon. Vacuum valve 219 is as disclosed in Doane et al. Pat. No. 3,039,157.

Referring back again to FIG. 8, and in cases where the machine according to the present invention is employed with a heat impression roller, structure is employed for removing the label from the raised pad 209 and transferring the same to a chute 226, see FIG. 4, where the same may be stored prior to disposal or other use. In such cases the gear 206 driving the shaft 208 meshes with a pair of reaching gears 227 and 228 mounted on stub shafts 229 and 231 in the front frame 54. Reaching gear 228 is fast with a gear 232 driving a gear 233 fast on a shaft 234. A pick-up roller 236 having a raised pad 237 is employed in such cases with a vacuum valve 238 to strip the used label from the raised pad 209 when the intelligence has been taken therefrom, the valve being controlled in its operation to release the stripped-off label into the chute 226. Vacuum valve 238 is also constructed as seen in the aforesaid Doane et al. Pat. No. 3,039,157.

In those cases where the machine 25 is arranged to sever, glue and apply the discrete label to the moving article M, the machine 25 is provided with structure for applying adhesive to the discrete label while it is carried by the impression roller 71 and prior to its application to the article M. Such adhesive applying structure is best seen in FIGS. 4 and 5, and is referred to generally by the reference numeral 240.

Details of the gue applying structure are seen in Doane et al. Pats. Nos. 3,039,517 and 3,005,565. In the event glue applying structure is supplied for pasting the label to the moving article, a gear 241 is arranged to mesh with the reaching gear 201, see FIG. 8. Gear 201 is fast on glue roller shaft 242 carrying a glue roller 243 cooperating with the raised pad 209 on the impression roller 71 which in such case does not have the heating structure 209, but does have the vacuum holding openings 221 and the knurled surface 222 seen in FIG. 14.

Referring back to FIGS. 15 and 18 inclusive, the sequence of operations taking place for the severing of the discrete label from the severed strip and the subsequent transfer to the impression roller 71 includes the step of feeding the strip into the bite of the knife and anvil rollers 69 and 68 as seen in FIG. 16. At this time the brake or drag 181 is off, and the label strip LS is freely pulled into the bite of said rollers.

Referring now particularly to FIGS. 19 to 21 inclusive, knife roller 69 has raised rim portions 246 and the knife 70 protrudes slightly therepast. Knife 70 is held in a slot 247 on roller 69 by a set screw 248. The raised rim portion 247 is molded to the roller 69, and preferably is made of a tough resilient material such as molded polyurethane.

Referring back again particularly to FIGS. 15 to 18, as the severing operation is completed as seen in FIG. 17, the vacuum is once more applied to the vacuum brake 181 to hold the label strip LS as it is being cut. Once the label L is severed, it is then transferred to the impression roller 71, but as soon as it is severed brake 181 is released and the bite of the rollers 68 and 69 draws an additional length of the label strip LS thereinto, the sequence of operations being continued until the last label of the strip has been fed into rollers 68 and 69, at which time the movable shear 66 has operated and a new label strip is placed on the shelf 133 to be started into the severing operation thereon by the operation of the operation of rollers 67 and 164.

It will be seen from the description foregoing that some new and useful improvements have been provided in the art of severing a strip from a form pack, severing the strip into discrete labels and applying the discrete label to a moving article such as a magazine or the like. In the alternate, the intelligence may be taken from a label having the intelligence thereon in reverse images and applied in the obverse image. In the case where the reverse images are of the type formed from inks rendered transferable by the application of spirits, the glue applying mechanism briefly described can equally as well be modified to apply a spirit film to the label as it is held on the impression roller 71.

In any case the label strip is severed from a form pack, and the so severed strip is advanced by the cooperation of an idler roller carried by the movable severing knife and cooperating with a roller arranged to start the strip into the bite of anvil and knife rollers to sever the strip into discrete labels, and thereafter move same on to an impression roller.

While the invention has been described in terms of some preferred embodiments thereof its scope is intended to be limited only by the claims here appended.

I claim:

1. In a machine for applying intelligence to a moving article such as a magazine or the like, said machine being adapted to apply said intelligence from a sheet thereof containing discrete bits of intelligence arranged in a plurality of columns with the intelligence in each column arranged at regularly spaced intervals, said machine including means for feeding the sheet and means for severing the same between adjacent bits of intelligence of a column to provide an intelligence bearing strip, strip severing means adapted to engage said strip therebetween and sever the same into a discrete portion of said strip bearing a discrete bit of intelligence thereon, an impression roller adapted to receive said discrete portion and apply the intelligence thereof onto said moving article; the improvements in said machine wherein said sheet severing means includes stationary knife means and movable knife means, means for receiving the so severed strip, and means for feeding the so severed strip for engagement by said strip severing means comprising a strip feed roller disposed between said strip receiving means and said strip severing means, and an idler roller supported on said movable knife and adapted to move into engagement with said strip feed roller with said strip therebetween to advance said strip to said strip severing means.

2. The invention as defined in claim 1 wherein said idler roller is biased toward said strip receiving means by means acting between a support for said stationary knife means and said idler roller.

3. The invention as defined in claim 1 wherein a brake is interposed between said strip receiving means and said strip severing means, and operable to impose a drag on said strip as the same is being severed by said strip severing means.

4. The invention as defined in claim 3 wherein said brake is released upon the initial feed movement of said strip feed roller and said idler roller into said strip severing means.

5. The invention as defined in claim 3 wherein said brake is operable only after said strip has been initially fed into said strip severing means.

6. In a machine for applying intelligence to a moving article such as a magazine or the like, said machine being adapted to apply said intelligence from a sheet thereof containing discrete bits of intelligence arranged in a plurality of columns with the intelligence in each column arranged at regularly spaced intervals, said machine including means for feeding the sheet and means for severing the same between adjacent bits of intelligence of a column to provide an intelligence bearing strip, strip severing means comprising a knife roller and an anvil roller adapted to engage said strip therebetween and sever the same into a discrete portion of said strip bearing a discrete bit of intelligence thereon, an impression roller adapted to receive said discrete portion and apply the intelligence thereof onto said moving article; the improvements in said machine wherein said sheet severing means includes stationary knife means and movable knife means, means for receiving the so severed strip, and means for feeding the so severed strip for engagement between said knife and anvil rollers comprising a strip feed roller disposed between said strip receiving means and said knife and anvil rollers, and an idler roller supported on said movable knife and adapted to move into engagement with said strip feed roller with said strip therebetween to advance said strip to said knife and anvil rollers.

7. The invention as defined in claim 6 wherein said idler roller is biased toward said strip receiving means by means acting between a support for said stationary knife means and said idler roller.

8. The invention as defined in claim 6 wherein a brake is interposed between said strip receiving means and said knife and anvil rollers, and operable to impose a drag on said strip as the same is being severed by said knife and anvil rollers.

9. The invention as defined in claim 8 wherein said brake is released upon the initial feed movement of said strip feed roller and said idler roller into said knife and anvil rollers.

10. The invention as defined in claim 8 wherein said brake is operable only after said strip has been initially fed into the bite of said knife and anvil rollers.

11. Improvements in machines substantially as shown and described.

No references cited.

EARL M. BERGERT, *Primary Examiner.*

D. J. DRUMMOND, *Assistant Examiner.*